United States Patent
Tomihashi et al.

(10) Patent No.: US 6,720,381 B1
(45) Date of Patent: Apr. 13, 2004

(54) WATER-BASED COMPOSITION FOR FLUORORUBBER VULCANIZATION AND ARTICLE COATED WITH FLUORORUBBER

(75) Inventors: Nobuyuki Tomihashi, Settsu (JP); Koichiro Ogita, Settsu (JP); Kiyotaro Terasaka, Settsu (JP); Yasukazu Nakatani, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/089,865

(22) PCT Filed: Oct. 4, 2000

(86) PCT No.: PCT/JP00/06895

§ 371 (c)(1),
(2), (4) Date: Apr. 5, 2002

(87) PCT Pub. No.: WO01/25330

PCT Pub. Date: Apr. 12, 2001

(30) Foreign Application Priority Data

Oct. 5, 1999 (JP) .............................................. 11/284120

(51) Int. Cl.⁷ .................................................. C08K 3/00
(52) U.S. Cl. ....................... 524/544; 524/500; 524/545; 252/511
(58) Field of Search ................................. 524/545, 500, 524/544; 252/511

(56) References Cited

U.S. PATENT DOCUMENTS

| | | | | |
|---|---|---|---|---|
| 4,482,476 A | * | 11/1984 | Yoshimura et al. ......... | 252/511 |
| 4,503,179 A | | 3/1985 | Yoshimura et al. ......... | 524/262 |
| 5,854,342 A | * | 12/1998 | Kirochko et al. .......... | 524/805 |
| 6,271,306 B1 | * | 8/2001 | Rodriguez et al. ......... | 524/845 |

FOREIGN PATENT DOCUMENTS

| | | | |
|---|---|---|---|
| EP | 0.058393 | * | 8/1982 |
| EP | 058393 | * | 8/1982 |
| EP | 0 058 393 A2 | | 8/1982 |
| EP | 0.690096 | * | 1/1996 |
| EP | 0 894 837 A1 | | 2/1999 |
| EP | 0 818 506 a1 | | 2/1999 |
| EP | 1 065 243 A1 | | 1/2001 |
| JP | 10-158458 A | | 6/1998 |
| JP | 11-240993 A | | 9/1999 |
| JP | 11-310748 A | | 11/1999 |

* cited by examiner

Primary Examiner—David W. Wu
Assistant Examiner—Henry Hu
(74) Attorney, Agent, or Firm—Birch, Stewart, Kolasch & Birch, LLP

(57) ABSTRACT

In an aqueous curing composition of a fluoroelastomer comprising a fluoroelastomer, a curing agent and a surfactant, a surfactant with which an amount of decomposition residues is 0.3% by weight or less after being baked at 300° C. for 30 minutes, for example, a polyoxyethylene alkyl ether or a polyoxyethylenepolyoxypropylene block polymer, is used as a surfactant. Such a composition can make use of the inherent characteristics of the fluoroelastomer.

12 Claims, No Drawings

WATER-BASED COMPOSITION FOR FLUORORUBBER VULCANIZATION AND ARTICLE COATED WITH FLUORORUBBER

This application is the national phase under 35 U.S.C. § 371 of PCT International Application No. PCT/JP00/06895 which has an International filing date of Oct. 4, 2000, which designated the United States of America.

FIELD OF THE INVENTION

The present invention relates to an aqueous curing composition of a fluoroelastomer and an article coated with a fluoroelastomer. In particular, the present invention relates an aqueous curing composition of a fluoroelastomer containing a specific surfactant, and an article coated with a coating film formed from such a composition.

BACKGROUND ART

Fluoroelastomer coating compositions are widely used as industrial materials with being coated on or impregnated in fabric, fibers, metals, plastics, rubbers and other various substrates by making use of good heat resistance, weather resistance, oil resistance, solvent resistance and chemical resistance of the fluoroelastomers. In these years, particularly, aqueous coating compositions are increasingly used since they are friendly to the environments.

The conventional aqueous composition of fluoroelastomers usually contain a polyoxyethylene alkylphenyl ether of the formula:

wherein R is an alkyl group, Ph is a phenylene group and n is an integer of at, least 1 as a surfactant.

However, this type of the surfactant tends to leave decomposition residues in the coating film of the fluoroelastomer after baking, since it has a relatively high decomposition temperature, and thus it may deteriorate the above-described inherent characteristics of the fluoroelastomer. When such a surfactant is used in a coating film covering the surface of a roll used in office automation equipment (e.g. copying machines, printers, etc.), the coating film has insufficient durability.

This type of the surfactant is not preferable from the viewpoint of environmental protection, since it is prepared from a raw material which is suspected to have internal secretion disturbing functions.

DISCLOSURE OF THE INVENTION

One object of the present invention is to provide an aqueous curing composition of a fluoroelastomer, which can make use of the inherent characteristics of the fluoroelastomer coating.

Another object of the present invention is to provide an article coated with a fluoroelastomer, which can solve the above drawbacks of the articles coated with a film formed from the conventional aqueous curing composition of a fluoroelastomer, in particular, the rolls of the office automation equipment.

The above objects can be achieved by an aqueous curing composition of a fluoroelastomer comprising a fluoroelastomer, a curing agent, and a surfactant with which an amount of decomposition residues is 0.3% by weight or less after being baked at 300° C. for 30 minutes, and an article at least a part of the surface of which is coated with a coating film formed from such an aqueous curing composition of a fluoroelastomer.

Hereinafter, the components contained in the composition of the present invention will be explained.

(A) Fluoroelastomer

The fluoroelastomer is usually supplied in the form of an aqueous dispersion. The aqueous dispersion of the fluoroelastomer is prepared by dispersing a fluorine-containing elastomeric copolymer (fluoroelastomer) in water at a concentration of 10 to 75% by weight in the presence of a surfactant.

The fluorine-containing elastomeric copolymer is a fluorine-containing copolymer containing repeating units represented by —$CH_2$— in the backbones. One typical example of such a copolymer is a fluorine-containing elastic copolymer comprising vinylidene fluoride. Examples of such copolymer are copolymers comprising at least one repeating unit selected from the group consisting of —$CF_2$—$CH_2$—, —$CH_2$—$CH_2$— and —$CH_2$—$CH(CH_3)$—, and at least one repeating unit selected from the group consisting of —$CF_2$—$CF(CF_3)$—, —$CF_2$—$CF_2$— and —$CF_2$—$CF(ORf)$— in which Rf is a fluoroalkyl group having 1 to 6 carbon atoms.

Specific examples of such copolymers include vinylidene fluoride-hexafluoropropylene copolymers, vinylidene fluoride-tetrafluoroethylene-hexafluoropropylene copolymers, ethylene-hexafluoropropylene copolymers, tetrafluoroethylene-propylene copolymers, etc. Among them, the vinylidene fluoride copolymers are preferable from the viewpoint of their crosslinkability.

Such fluorine-containing elastomeric copolymers are commercially distributed under the trade name of "DAIEL®" (available from Daikin Industries, Ltd.), "VITONE FLOME®" (available from E. I. duPont), "AFLAS®" (available from ASAHI GLASS Co., Ltd.), etc.

The amount of the fluoroelastomer (solid component) to be contained in the composition of the present invention is from 1 to 500 parts by weight, preferably from 5 to 300 parts by weight, more preferably from 10 to 150 parts by weight, per 100 parts by weight of water.

(B) Curing Agent and Curing Accelerator

The curing agent to be contained in the aqueous curing composition of the present invention may be either a conventional diamine curing agent or a conventional polyol curing agent.

Examples of the diamine curing agent include an aminosilane compound of the formula:

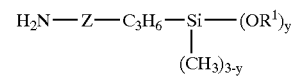

wherein $R^1$ is a methyl group or an ethyl group, Z is a single bond, —$C_2H_4NH$—, —$CONH$— or —$C_2H_4NH$—$C_2H_4NH$—$NH$—, and y is 2 or 3, or its partially or completely hydrolyzed products, and a polyaminosiloxane compound of the formula:

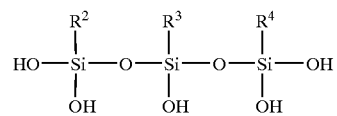

wherein $R^2$, $R^3$ and $R^4$ represent independently of each other a hydrogen atom, an alkyl group having 1 to 6 carbon atom, an amino group, a polyamino group, or an alkyl group having 1 to 6 carbon group at least one hydrogen atom of which is replaced with an amino group or a polyamino group provided that the amino groups are present in at least two of $R^2$, $R^3$ and $R^4$ or a polyamino group is present in at least one of $R^2$, $R^3$ and $R^4$.

The polyol curing agent used in the present invention may be a compound or a polymer having at least two hydroxyl groups, in particular, phenolic hydroxyl groups in a molecule, and having a curing capability. Specific examples of polyol curing agents include salts of basic compounds with phenol compounds such as

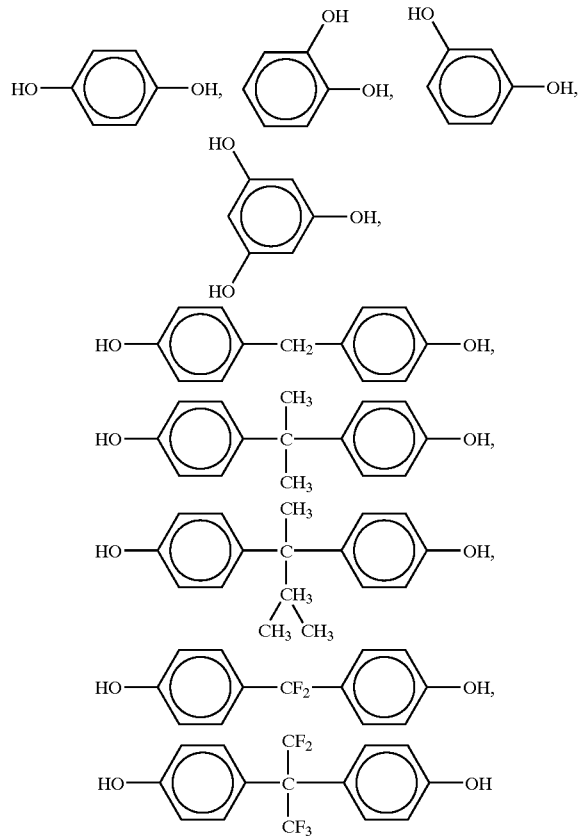

and polyphenols represented by the formula:

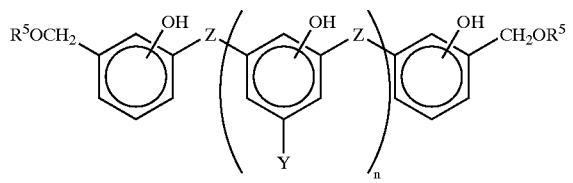

wherein Y is a hydrogen atom, a halogen atom, $R^5$, —$CH_2OR^5$ or —$OR^5$, Z is —$CH_2$— or —$CH_2OCH_2$—, $R^5$ is an alkyl group having 1 to 4 carbon atoms, and n is an integer of 0 to 100.

Examples of the basic compounds include ammonium salts, tertiary amines, phosphonium salts, alkali metals and alkaline earth metals.

Specific examples of ammonium salts include trimethylbenzylammonium, triethylbenzylammonium, dimethyldecylbenzylammonium, triethylbenzylammonium, myristylbenzyldimethylammonium, dodecyltrimethyl-ammonium, dimethyltetradecylbenzylammonium, trimethyltetradecylammonium, coconuttrimethylammonium, stearyltrimethylammonium, distearyldimethylammonium, tetrabutylammonium, 1,4-phenylenedimethylenebistrimethylammonium, 1,4-phenylenedimethylenebistriethylammonium, ethylenebistriethylammonium, etc.

Specific examples of tertiary amines include 1,8-diaza-bicyclo[5.4.0]-undecene-7, 8-methyl-1,8-diaza-bicyclo[5.4.0]-undecene-7, 8-propyl-1,8-diazabicyclo[5.4.0]-undecene-7, 8-dodecyl-1,8-diaza-bicyclo[5.4.0]-undecene-7, 8-eicocyl-1,8-diaza-bicyclo[5.4.0]-undecene-7, 8-tetracocyl-1,8-diaza-bicyclo[5.4.0]-undecene-7, 8-benzyl-1,8-diaza-bicyclo[5.4.0]-undecene-7, 8-phenethyl-1,8-diazabicyclo-[5.4.0]-undecene-7, 8-(3-phenylpropyl)-1,8-diaza-bicyclo[5.4.0]-undecene-7, trimethylamine, triethylamine, tri-n-propylamine, tri-n-butylamine, triisobutylamine, methyldiethylamine, dimethylethylamine, dimethyl-n-propylamine, dimethyl-n-butylamine, dimethylisobutylamine, dimethylisopropylamine, dimethyl-sec.-butylamine, dimethyl-tert.-butylamine, triallylamine, diallylmethylamine, allyldimethylamine, benzyldimethylamine, benzyldiethylamine, N-allylpiperidine, N-ethylpiperidine, N-butylpiperidine, N-methylpyrolidine, N-cyclohexylpyrolidine, N-n-butylpyrolidine, N-ethylpyrolidine, N-benzylpyrolidine, 2,4,6-trimethylpyridine, etc.

Specific examples of phosphonium salts include benzyltriphenylphosphonium, methyltriphenylphosphonium, 2,4-dichlorobenzyltriphenylphosphonium, 4-methylbenzyltriphenylphosphonium, 4-chlorobenzyltriphenylphosphonium, m-trifluoromethylbenzyltriphenylphosphonium, 2-cyanobenzyltriphenylphosphonium, α-carbethoxybenzyltriphenylphosphonium, diphenylmethyltriphenylphosphonium, 1-naphthylmethyltriphenylphosphonium, carbethoxymethyltriphenylphosphonium, methoxymethyltriphenylphosphonium, allyloxymethyltriphenylphosphonium, 1-carbethoxyethyltriphenylphosphonium, isobutyltriphenylphosphonium, 4-cyanobutyltriphenylphosphonium, 2-pentyltriphenylphosphonium, allyltriphenylphosphonium, tetraphenylphosphonium, methyltrioctylphosphonium, benzyltrioctylphosphonium, methoxyethoxyethyltrioctylphosphonium, butyltrioctylphosphonium, m-trifluoromethylbenzyltrioctylphosphonium, 2,2,3,3-tetrafluoropropyltrioctylphosphonium, 2,2,3,3,4,4,5,5-octafluoropentyltrioctylphosphonium, tetraoctylphosphonium, tetrabutylphosphonium, etc.

Specific examples of alkali metals are lithium, sodium, potassium, etc.

Specific examples of alkaline earth metals are beryllium, magnesium, calcium, barium, etc.

Among them, the salts of hydroquinone, bisphenol A, bisphenol AF or the resol type polyphenols with ammonium salts or tertiary amines are preferable from the viewpoint of the properties of the coating film. Hydroquinone, bisphenol A, bisphenol AF and the resol type polyphenols have excellent curing properties, and the ammonium salts and the tertiary amines do not leave the decomposition residues in the coating film unlike the alkali metals or the alkaline earth metals.

When the polyol curing agent is used, the following compounds may be compounded as the optional curing accelerators:

(a) Quaternary Ammonium Salts

A quaternary ammonium salt of the formula:

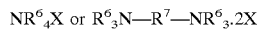

wherein R⁶ groups are the same or different and represent an alkyl group having 1 to 20 carbon atoms, a halogenated alkyl group having 1 to 20 carbon atoms or an aryl group having 6 to 20 carbon atoms, provided that two or more of R⁶ groups may together form a carbocyclic group or a heterocyclic group; R⁷ is an alkylene group having 2 to 21 carbon atom or a phenylenedialkylene group having 8 to 12 carbon atoms; and X is an acid radical or a hydroxyl group.

Examples of acid radicals include halides, sulfate, sulfite, bisulfite, thiosulfate, sulfide, polysulfide, hydrogen sulfide, thiocyanate, carbonate, bicarbonate, nitrate, carboxylate, borate, phosphate, biphosphate, phosphite, perchlorate, bifluoride, arsenate, ferricyanide, ferrocyanide, molybdate, selenate, selenite, uranate, tungstate, etc.

Specific examples of the quaternary ammonium salts include alkyl and aralkyl quaternary ammonium salts (e.g. trimethylbenzylammonium chloride, triethylbenzylammonium chloride, dimethyldecyibenzylammonium chloride, triethylbenzylammonium chloride, myristylbenzyldimethylammonium chloride, dodecyltrimethylammonium chloride, dimethyltetradecylbenzylammonium chloride, trimethyltetradecylammonium chloride, coconuttrimethylammonium chloride, stearyltrimethylammonium chloride, distearyldimethylammonium chloride, tetrabutylammonium hydroxide, 1,4-phenylenedimethylene-bistrimethylammonium dichloride, 1,4-phenylenedimethylene-bistriethylammonium dichloride, ethylenebistriethylammonium dibromide, etc.), and quaternary 1,8-diaza-bicyclo[5.4.0]-7-undecenium salts (e.g. 8-methyl-1,8-diaza-bicylo[5.4.0]-7-undecenium chloride, 8-methyl-1,8-diaza-bicylo[5.4.0]-7-undecenium iodide, 8-methyl-1,8-diaza-bicylo[5.4.0]-7-undecenium hydroxide, 8-methyl-1,8-diaza-bicylo[5.4.0]-7-undecenium methylsulfate, 8-methyl-1,8-diaza-bicylo[5.4.0]-7-undecenium bromide, 8-propyl-1,8-diaza-bicylo[5.4.0]-7-undecenium bromide, 8-dodecyl-1,8-diaza-bicylo[5.4.0]-7-undecenium chloride, 8-dodecyl-1,8-diaza-bicylo[5.4.0]-7-undecenium hydroxide, 8-eicosyl-1,8-diaza-bicylo[5.4.0]-7-undecenium chloride, 8-tetracosyl-1,8-diaza-bicylo[5.4.0]-7-undecenium chloride, 8-benzyl-1,8-diaza-bicylo[5.4.0]-7-undecenium chloride, 8-benzyl-1,8-diaza-bicylo[5.4.0]-7-undecenium hydroxide, 8-phenethyl-1,8-diaza-bicylo[5.4.0]-7-undecenium chloride, 8-(3-phenylpropyl)-1,8-diaza-bicylo[5.4.0]-7-undecenium chloride, etc.).

(b) Quaternary Salt of Amine With Organic or Inorganic Acid

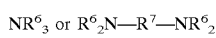

wherein R⁶ and R⁷ are the same as defined above.

Specific examples of the tertiary amines include trimethylamine, triethylamine, tri-n-propylamine, tri-n-butylamine, triisobutylamine, methyldiethylamine, dimethylethylamine, dimethyl-n-propylamine, dimethyl-n-butylamine, dimethylisobutylamine, dimethylisopropylamine, dimethyl-sec.-butylamine, dimethyl-tert.-butylamine, triallylamine, diallylmethylamine, allyldimethylamine, benzyldimethylamine, benzyldiethylamine, N-allylpiperidine, N-ethylpiperidine, N-butylpiperidine, N-methylpyrolidine, N-cyclohexylpyrolidine, N-n-butylpyrolidine, N-ethylpyrolidine, N-benzylpyrolidine, 2,4,6-trimethylpyridine, etc.

Examples of the inorganic or organic acids which form the quaternary salts include the following acids:

HCl, HBr, HF, $(C_2H_5)_3NH^+Cl^-$, $(C_2H_5)_3NH^+NO_3^-$, $2(C_2H_5)_3NH^+SO_4^{2-}$, $2(C_2H_5)_3NH^+CO_3^{2-}$, $(C_2H_5)_3NH^+R^8O^-$, $(C_2H_5)_3NH^+R^8COO^-$, $(C_4H_9)_3NH^{+Cl-}$, $(C_4H_9)_3NH^+NO_3^-$, $2(C_4H_9)_3NH^+SO_4^{2-}$, $2(C_4H_9)_3NH^+CO_3^{2-}$, $(C_4H_9)_3NH^+R^8O^-$, $(C_4H_9)_3NH^+R^8COO^-$ wherein R⁸ is an alkyl or alkenyl group having 1 to 20 carbon atoms or an aryl group having 6 to 20 carbon atoms.

Primary and secondary amines are less preferable since they may induce reactions other than the polyol curing.

(c) Quaternary Phosphonium Salt

A quaternary phosphonium salt of the formula:

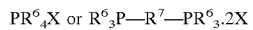

wherein R⁶, R⁷ and X are the same as defined above.

Examples of the phosphonium salts include benzyltriphenylphosphonium chloride, benzyltriphenylphosphonium bromide, methyltriphenylphosphonium methylmethanephosphonate, bis(benzyldiphenylphosphin)iminium chloride, 2,4-dichlorobenzyltriphenylphosphonium chloride, 4-methylbenzyltriphenylphosphonium chloride, 4-chlorobenzyltriphenylphosphonium chloride, m-trifluoromethylbenzylriphenylphosphonium chloride, 2-cyanobenzyltriphenylhosphonium bromide, α-carbethoxybenzyltriphenylphosphonium bromide, diphenylmethyltriphenylphosphonium chloride, 1-naphthylmethyltriphenylphosphonium chloride, carbethoxymethyltriphenylphosphonium bromide, methoxymethyltriphenylphosphonium chloride, allyloxymethyltriphenylphosphonium chloride, 1-carbethoxyethyltriphenylphosphonium chloride, isobutyltriphenylphosphonium bromide, 4-cyanobutyltriphenylphosphonium bromide, 2-pentyltriphenylphosphonium bromide, allyltriphenylphosphonium chloride, tetraphenylphosphonium chloride, tetraphenylphosphonium bromide, methyltrioctylphosphonium chloride, methyltrioctylphosphonium tetrafluoroborate, methyltrioctylphosphonium acetate, methyltrioctylphosphonium dimethylphosphate, benzyltrioctylphosphonium chloride, benzyltrioctylphosphonium bromide, methoxyethoxyethyltrioctylphosphonium chloride, butyltrioctylphosphonium bromide, m-trifluoromethylbenzyltrioctylphosphonium chloride, 2,2,3,3-tetrafluoropropyltrioctylphosphonium chloride, 2,2,3,3,4,4,5,5-octafluoropentyltrioctylphosphonium chloride, tetraoctylphosphonium bromide, tetrabutylphosphonium chloride, etc.

(d) Organic Acid

In the present invention, organic acids can be added to the composition to improve the storage stability of the composition. Organic acids having 1 to 12 carbon atoms, preferably 1 to 4 carbon atoms are used. Organic acids having 13 or more carbon atoms are less preferable, since they remain in the coating films. Preferable examples of the organic acids are monocarboxylic acids such as formic acid, acetic acid, propionic acid, etc.; and dicarboxylic acids such as oxalic acid, malonic acid, succinic acid, etc.

The organic acids suppress the polyol curing of the fluorine-containing copolymers in the compositions during storage. However, the organic acids evaporate or decompose when the compositions are applied, dried and baked, and then the basic compound can accelerate the curing reaction. Thus, the organic acid is included in the "curing accelerators" according to the present invention.

The composition of the present invention contains 0.01 to 50 parts by weight, preferably 0.1 to 20 parts by weight of the amine curing agent, per 100 parts by weight of the fluoroelastomer in the case of the diamine curing, or the composition contains 0.1 to 20 parts by weight, preferably 1 to 10 parts by weight of the polyol curing agent, and 0 to 10 parts by weight, preferably 0.01 to 5 parts by weight of the curing accelerator, per 100 parts by weight of the fluoroelastomer in the case of the polyol curing. When the amount of the curing accelerator is less than the above lower limit, the curing may not proceed. When the amount of the curing accelerator exceeds the above upper limit, it may be difficult to control the curing reaction.

(C) Surfactant

Ionic surfactants and nonionic surfactants may be used as surfactants to disperse the fluoroelastomer and various additives in water, but they should be decomposed at a relatively low temperature. That is, in the present invention, the surfactant should leave 0.3% by weight or less, preferably 0.25% by weight or less, more preferably 0.1% by weight or less of a decomposition residue after being heated at 300° C. for 30 minutes.

Examples of such surfactants include nonionic surfactants having no phenyl group such as a polyoxyethylene alkyl ether of the formula:

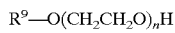

wherein $R^9$ is an alkyl group, preferably an alkyl group having 1 to 20 carbon atoms, and n is a number of at least 1 (one), preferably up to 30, more preferably up to 20, and a polyoxyethylenepolyoxypropylene block copolymer of the formula:

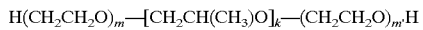

wherein m, m' and k are each a number of at least 1 provided that the sum of m, m' and k is preferably no more than 1,000, more preferably no more than 500.

These surfactants are preferable from the viewpoint of environment protection, since they are prepared without using any chemical material that is doubtful if it may have internal secretion disturbing functions as a raw material, and they are synthesized from internal secretion non-disturbing materials.

The surfactant, which leaves 0.3% by mole or less of the decomposition residue after being heated at 300° C. for 30 minutes, is added to the composition in an amount of 1 to 100 parts by weight, preferably 10 to 50 parts by weight, per 100 parts by weight of the fluoroelastomer.

(D) Additives

The composition of the present invention may contain various additives which are added to conventional fluoroelastomer compositions, for example, fillers, colorants, acid-acceptors, and the like, in addition to the above components.

Examples of the fillers are carbon black, white carbon, calcium carbonate, barium sulfate, etc., and examples of the colorants are inorganic pigments, compound oxide pigments, etc.

Examples of the acid-acceptors are magnesium oxide, lead oxide, zinc oxide, lead carbonate, zinc carbonate, double salts such as hydrotalcite, etc. Compounds having a high activity such as calcium hydroxide are less preferred, since they tend to cause gelation. Preferably, the acid-acceptors have a smaller pKa than that of the above basic compounds. When the pKa of acid-acceptors is high, the compositions of the present invention tend to be gelled.

In general, the acid-acceptor is compounded in an amount of from 1 to 40 parts by weight per 100 parts by weight of a fluorine-containing copolymer, depending on its activity.

The compositions of the present invention may be applied and cured by the same methods as those for applying and curing the conventional aqueous curing composition of the fluoroelastomer.

For example, the compositions are applied to an article to be coated by brush coating, spray coating, dip coating, flow coating, dispenser coating, screen coating, etc. according to the properties of the compositions, and thoroughly dried. Then, the compositions coated are baked at a temperature of from 150 to 300° C. for 10 to 120 minutes.

Furthermore, a surface layer may be formed on the coating film formed from the composition of the present invention. The surface layer may be formed from a fluororesin and/or a terminal-modified perfluoropolyether by a conventional method.

Examples of the fluororesin include polyvinylidene fluoride (PVdF), ethylene-tetrafluoroethylene copolymers (ETFE), polychlorotrifluoroethylene (PCTFE), tetrafluoroethylene-hexafluoropropylene-perfluoroalkyl vinyl ether copolymers (EPA), tetrafluoroethylene-hexafluoro-propylene copolymers (FEP), tetrafluoroethylene-perfluoroalkyl vinyl ether copolymers (PFA), polytetrafluoroethylene (PTFE), terminal-modified EPA, terminal-modified FEP, terminal-modified PFA, etc. Among them, tetrafluoroethylene base polymers are preferable from the viewpoint of the non-stickiness.

The terminal-modified perfluoropolyether to be used in the present invention comprises at least one repeating unit selected from the group consisting of —[CF(CF$_3$)—CF$_2$O]—, —(CF$_2$O)—, —(CF$_2$CF$_2$O)— and —(CF$_2$CF$_2$CF$_2$O)— in its backbone. The total number of the repeating units is from 1 to 1,000.

Examples of functional groups which modify the molecular terminals of the perfluoropolyether include Cl, Br, I, NR$^{10}$R$^{11}$ wherein $R^{10}$ and $R^{11}$ are independently of each other and represent a hydrogen atom, an aryl group, a $C_1$–$C_{10}$ alkyl group or a $C_3$–$C_{10}$ cycloalkyl group, SH, NCO, NO$_2$, COOH, PO$_2$H, SO$_3$H, OH, a glycidyl group or a hydroxyphenyl group. The functional groups may be present at the terminals of the backbone or the terminal of side chains of the perfluoropolyether.

These functional groups may be directly bonded to the backbone consisting of the above repeating units of the perfluoropolyether, or through a group of the formula: —(CH$_2$)$_n$—, —(CF$_2$)$_n$—, —(CH$_2$O)$_n$— or —(CF$_2$O)$_n$— in which n is a number of 1 to 100.

The surface of an article to be coated is preferably well degreased and cleaned prior to the application of the composition of the present invention.

It is preferable to form a primer layer on the surface of the article with silane primers, silicone primers, etc. to increase the adhesion between the article and the composition.

Examples of the articles to be coated with the composition of the present invention include metals (e.g. iron, stainless steel, copper, aluminum, brass, etc.), glass products (e.g. such as glass plates, fabric or non-woven fabric of glass fiber, etc.), molded articles and coated articles of general or heat-resistant resins (e.g. polypropylene, polyoxymethylene, polyimide, polyamideimide, polysulfone, polyethersulfone, polyetheretherketone, etc.), molded articles and coated articles of general rubbers (e.g. styrene-butadiene rubber (SBR), butyl rubber, nitrile rubber (NBR), ethylene-propylene rubber (EPDM), etc.) and heat-resistant rubbers (e.g. silicone rubber, fluoroelastomer, etc.), fabric or nonwoven fabric of natural and synthetic fibers, and the like.

The articles coated with the film formed from the composition of the present invention can be used in various fields which require heat resistance, solvent resistance, lubrication and/or non-stick properties. Specific examples of the applications include rolls (e.g. fixing rolls, press rolls, etc.) and conveying belts for OA equipment such as copying machines, printers, facsimiles, etc.; sheetsandbelts; O-rings, diaphragms, chemical-resistant tubes, fuel hoses, valve seals, gaskets for chemical plants, engine gaskets, and the like.

EXAMPLES

The present invention will be illustrated by the following examples.

Example 1

Preparation of "Fluoroelastomer Dispersion A"

A copolymer of vinylidene fluoride (VdF)-tetrafluoroethylene (TFE)-hexafluoropropylene (HFP) (monomer composition=65:18:17) was prepared by emulsion polymerization, and the resulting polymer solution was concentrated with surfactants (a 20 wt. % aqueous solution of EAD-13 available from NOF Corporation and a 20 wt. % aqueous solution of EAD-15 available from NOF Corporation, both containing $C_{13}H_{27}$—$O(CH_2CH_2O)_nH$ as the main component) to a solid concentration of 60% by weight. This dispersion will be referred to as "Fluoroelastomer Dispersion A".

Preparation of "Pigment Paste A"

A filler (MT carbon black) (12 parts by weight) and an acid-acceptor (DHT-4A available from KYOWA KAGAKU KOGYO Kabushikikaisha) (3 parts by weight) were dispersed in pure water (28 parts by weight) together with a surfactant (a 20 wt. % aqueous solution of EDA-13 available from NOF Corporation) (2 parts by weight) to obtain a paste, which will be referred to as "Pigment Paste A".

Preparation of "Coating Composition A"

Fluoroelastomer Dispersion A (7 parts by weight) and Pigment Paste A (3 parts by weight) were mixed and well dispersed. To the aqueous dispersion obtained (20 parts by weight), a diamine curing agent (GL-252B available from Daikin Industries, Ltd.) (1 part by weight) was added to obtain a coating composition, which will be referred to as "Coating Composition A".

Formation of a Coating Plate

On the surface of an aluminum plate, a primer (GLP-102NR available from Daikin Industries, Ltd.) was applied to a dry thickness of about 5 $\mu$m, and dried at 80° C. for 15 minutes.

On the primer layer formed, Coating Composition A was spray coated and dried at 80 to 100° C. for 15 minutes, followed by baking at 300° C. for 30 minutes to obtain a coating plate having a film thickness of about 35 $\mu$m (including the primer layer).

Properties of a Coating Film

The non-tackiness and tensile properties of the coating film were evaluated as follows:

Non-tackiness

A drop of pure water or n-cetane was dropped on the surface of the coating film, and a contact angle was measured with a goniometer (available from KYOWA KAIMEN-KAGAKU KABUSHIKIKAISHA).

Tensile Properties

The coating composition prepared was poured in a metal tray, dried at room temperature for 5 days and then at 80 to 100° C., and baked at 250° C. for 30 minutes. The formed film was removed from the tray and punched in the form of a JIS No. 4 dumbbell. The sample was then subjected to a tensile test at a pulling rate of 500 mm/min. to measure a 100% tensile stress, a strength at break, and an elongation at break.

Example 2

Preparation of "Fluoroelastomer Dispersion B"

A copolymer of VdF-TFE-HFP (monomer composition=65:18:17) was prepared by emulsion polymerization, and the resulting polymer solution was concentrated with a surfactant (a 20 wt. % aqueous solution of TD-90 available from Lion Corporation containing $C_{13}H_{27}$—$O(CH_2CH_2O)_nH$ as the main component) to a solid concentration of 60% by weight. This dispersion will be referred to as "Fluoroelastomer Dispersion B".

Preparation of "Coating Composition B"

Fluoroelastomer Dispersion B (7 parts by weight) and Pigment Paste A (3 parts by weight) were mixed and well dispersed. To the aqueous dispersion obtained (20 parts by weight), a diamine curing agent (GL-252B available from Daikin Industries, Ltd.) (1 part by weight) was added to obtain a coating composition, which will be referred to as "Coating Composition B".

Then, the same procedures as those in Example 1 were repeated except that Coating Composition B was used in place of Coating Composition A.

Comparative Example 1

Preparation of "Fluoroelastomer Dispersion C"

A copolymer of VdF-TFE-HFP (monomer composition=65:18:17) was prepared by emulsion polymerization, and the resulting polymer solution was concentrated with surfactants (a 20 wt. % aqueous solution of HS-208 available from NOF Corporation and a 20 wt. % aqueous solution of HS-215 available from NOF Corporation, both containing $C_8H_{17}$—Ph—$O(CH_2CH_2O)_nH$ as the main component) to a solid concentration of 60% by weight. This dispersion will be referred to as "Fluoroelastomer Dispersion C".

Preparation of "Pigment Paste B"

A filler (MT carbon black) (12 parts by weight) and an acid-acceptor (DHT-4A available from KYOWA KAGAKU KOGYO Kabushikikaisha) (3 parts by weight) were dispersed in pure water (28 parts by weight) together with a surfactant (a 20 wt. % aqueous solution of HS-208 available from NOF Corporation) (2 parts by weight) to obtain a paste, which will be referred to as "Pigment Paste B".

Preparation of "Coating Composition C"

Fluoroelastomer Dispersion C (7 parts by weight) and Pigment Paste B (3 parts by weight) were mixed and well dispersed. To the aqueous dispersion obtained (20 parts by weight), a diamine curing agent (GL-252B available from Daikin Industries, Ltd.) (1 part by weight) was added to obtain a coating composition, which will be referred to as "Coating Composition C".

Then, the same procedures as those in Example 1 were repeated except that Coating Composition C was used in place of Coating Composition A.

Example 3

Preparation of "Coating Composition D"

Fluoroelastomer Dispersion A (7 parts by weight) and Pigment Paste A (3 parts by weight) were mixed and well dispersed. To the aqueous dispersion obtained (20 parts by weight), a polyol curing agent (a 10 wt. % aqueous solution of ammonium salt of bisphenol AF) (1 part by weight) and a curing accelerator (SA 610-50 available from SAN-APRO Co., Ltd.; main component: a 50 wt. % solution of formate salt of DBU in dipropylene glycol) (0.1 part by weight) were added to obtain a coating composition, which will be referred to as "Coating Composition D".

Then, the same procedures as those in Example 1 were repeated except that Coating Composition D was used in place of Coating Composition A.

Example 4

Preparation of "Coating Composition E"

Fluoroelastomer Dispersion B (7 parts by weight) and Pigment Paste A (3 parts by weight) were mixed and well dispersed. To the aqueous dispersion obtained (20 parts by weight), a polyol curing agent (a 10 wt. % aqueous solution of ammonium salt of bisphenol AF) (1 part by weight) and a curing accelerator (SA 610-50 available from SAN-APRO Co., Ltd.) (0.1 part by weight) were added to obtain a coating composition, which will be referred to as "Coating Composition E".

Then, the same procedures as those in Example 1 were repeated except that Coating Composition E was used in place of Coating Composition A.

Comparative Example 2

Preparation of "Coating Composition F"

Fluoroelastomer Dispersion C (7 parts by weight) and Pigment Paste B (3 parts by weight) were mixed and well dispersed. To the aqueous dispersion obtained (20 parts by weight), a polyol curing agent (a 10 wt. % aqueous solution of ammonium salt of bisphenol AF) (1 part by weight) and a curing accelerator (SA 610-50 available from SAN-APRO Co., Ltd.) were added to obtain a coating composition, which will be referred to as "Coating Composition F".

Then, the same procedures as those in Example 1 were repeated except that Coating Composition F was used in place of Coating Composition A.

The results obtained in Examples and Comparative Examples are shown in Table 1.

TABLE 1

| | Ex. 1 | Ex. 2 | C. E. 1 | Ex. 3 | Ex. 4 | C. E. 2 |
|---|---|---|---|---|---|---|
| Surfactant(s) to disperse fluoro-elastomer dispersion | EAD-13 EAD-15 | TD-90 | HS-208 HS-215 | EAD-13 EAD-15 | TD-90 | HS-208 HS-215 |
| Curing system | Poly-amine curing | Poly-amine curing | Poly-amine curing | Polyol curing | Polyol curing | Polyol curing |
| Non-tackiness (contact angle: degrees) | | | | | | |
| Pure water | 95 | 96 | 93 | 99 | 99 | 96 |
| n-Cetane | 41 | 42 | 39 | 45 | 44 | 42 |
| Tensile properties | | | | | | |
| 100% tensile stress (kgf/cm$^2$) | 68 | 69 | 69 | 10 | 12 | 13 |
| Strength at break (kgf/cm$^2$) | 130 | 135 | 110 | 80 | 82 | 63 |
| Elongation at break (%) | 270 | 270 | 240 | 770 | 800 | 620 |

Measurement of the amount of decomposition residue of surfactants:

About 5 g of a surfactant was sampled in an aluminum cup, kept standing in an air at 100° C. for 15 minutes and then heated in the air at 300° C. for 30 minutes. After that, the weight of the aluminum cup containing the decomposition residue was measured, and the amount of the decomposition residue was calculated from the original weight and the weight after heating.

The results are shown in Table 2.

TABLE 2

| Surfactant | Amount of decomposition residue (%) |
|---|---|
| EAD-13 | 0 |
| EAD-15 | 0 |
| TD-90 | 0 |
| HS-208 | 0.38 |
| HS-215 | 2.29 |

What is claimed is:

1. An aqueous curing composition of a fluoroelastomer comprising a fluoroelastomer, a curing agent, and a surfactant, wherein after the surfactant is baked at 300° C. for 30 minutes the surfactant leaves decomposition residue in an amount of 0.3% by weight or less.

2. The aqueous curing composition of a fluoroelastomer according to claim 1, wherein said surfactant is a compound synthesized from an internal secretion non-disturbing chemical substance.

3. The aqueous curing composition of a fluoroelastomer according to claim 1, wherein said surfactant is a non-ionic surfactant having no phenyl group.

4. The aqueous curing composition of a fluoroelastomer according to claim 3, wherein said non-ionic surfacatnt having n phenyl group is at least one surfactant selected from the group consisting of polyoxyethylene alkyl ethers and polyoxyethylenepolyoxypropylene block polymers.

5. The aqueous curing composition of a fluoroelastomer according to claim 4, wherein said polyoxyethylene alkyl ether is a compound of the formula:

$$R^9-O(CH_2CH_2O)_nH$$

wherein $R^9$ is an alkyl group and n is a number of at least 1, and said polyoxyethylenepolyoxypropylene block copolymer is a compound of the formula:

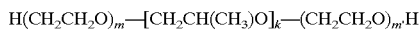

wherein m, m' and k are each a number of at least 1.

6. An article at least a part of a surface of which is coated with a coating film formed from an aqueous curing composition according to any one of claims 1 to 5.

7. The article according to claim 6, which is a roll for office automation equipment.

8. The aqueous curing composition of a fluoroelastomer according to claim 5, wherein said non-ionic surfactant is a polyoxyethylene alkyl ether.

9. The aqueous curing composition of a fluoroelastomer according to claim 5, wherein said non-ionic surfactant is a polyoxyethylenepolyoxypropylene block copolymer.

10. The aqueous curing composition of a fluoroelastomer according to claim 1, wherein said fluoroelastomer is selected from the group consisting of vinylidene fluoride-hexafluoropropylene copolymers, vinylidene fluoride-tetrafluoroethylene-hexafluoropropylene copolymers, ethylene-hexafluoropropylene copolymers, and tetrafluoroethylene-propylene copolymers.

11. The aqueous curing composition of a fluoroelastomer according to claim 5, wherein the sum of m, m' and k is no more than 1000.

12. The aqueous curing composition of a fluoroelastomer according to claim 5, wherein the sum of m, m' and k is no more than 500.

* * * * *